(12) United States Patent
Inoshita

(10) Patent No.: US 11,954,901 B2
(45) Date of Patent: Apr. 9, 2024

(54) TRAINING DATA GENERATION APPARATUS

(71) Applicant: NEC Corporation, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 361 days.

(21) Appl. No.: 17/602,403

(22) PCT Filed: Apr. 25, 2019

(86) PCT No.: PCT/JP2019/017766
§ 371 (c)(1),
(2) Date: Oct. 8, 2021

(87) PCT Pub. No.: WO2020/217425
PCT Pub. Date: Oct. 29, 2020

(65) Prior Publication Data
US 2022/0215653 A1    Jul. 7, 2022

(51) Int. Cl.
*G06N 3/08* (2023.01)
*G06V 10/774* (2022.01)
*G06V 10/778* (2022.01)

(52) U.S. Cl.
CPC .......... *G06V 10/7747* (2022.01); *G06N 3/08* (2013.01); *G06V 10/7788* (2022.01)

(58) Field of Classification Search
CPC .......... G06V 10/7747; G06V 10/7788; G06V 10/772; G06V 10/774; G06V 20/47; G06N 3/08; G06N 3/045; G06N 20/00; G06T 7/00
See application file for complete search history.

(56) References Cited

U.S. PATENT DOCUMENTS

| 2015/0227852 | A1 | 8/2015 | Kanna et al. |
| 2018/0342077 | A1 | 11/2018 | Tsuno et al. |
| 2019/0095759 | A1 | 3/2019 | Kanada |
| 2020/0183412 | A1* | 6/2020 | Viswanathan ..... G01C 21/3848 |
| 2022/0067480 | A1* | 3/2022 | Ikeda ..................... G06N 3/045 |

FOREIGN PATENT DOCUMENTS

| JP | 2010-033532 A | 2/2010 |
| JP | 2015-148981 A | 8/2015 |
| JP | 2018-200531 A | 12/2018 |
| JP | 2019-061579 A | 4/2019 |

OTHER PUBLICATIONS

International Search Report for PCT Application No. PCT/JP2019/017766, dated Jul. 30, 2019.
JP Office Action for JP Application No. 2021-515437, dated Aug. 2, 2022 with English Translation.

* cited by examiner

*Primary Examiner* — Chuong A Ngo

(57) ABSTRACT

A selecting unit selects first to third moving image data from a plurality of frame images composing moving image data. A first generating unit generates first training data that is labeled data relating to a specific recognition target from the first moving image data. A first learning unit learns a first model recognizing the specific recognition target by using the first training data. A second generating unit generates second training data from the second moving image data by using the first model. A second learning unit learns a second model by using the second training data. A third generating unit generates third training data from the third moving image data by using the second model.

17 Claims, 8 Drawing Sheets

FIG. 5

| objects | Precision (%) | |
|---|---|---|
| | K-means | Random |
| person(standing) | 79.63 | 74.64 |
| person(sitting) | 97.21 | 92.48 |
| head | 87.76 | 86.73 |
| backpack | 64.64 | 57.56 |
| suitcase | 51.80 | 41.15 |
| other bags | 46.83 | 41.64 |
| mean AP | 71.31 | 65.70 |

TRAINING DATA GENERATION APPARATUS

This application is a National Stage Entry of PCT/JP2019/017766 filed on Apr. 25, 2019, the contents of all of which are incorporated herein by reference, in their entirety.

TECHNICAL FIELD

The present invention relates to a training data generation apparatus, a training data generation method, and a recording medium.

BACKGROUND ART

In recent years, data analysis systems using deep learning have been proposed or put into practical use. Recognition of an object in an image by deep learning requires an image with a truth label indicating what the object is. Herein, a pair of a truth label and an image is referred to as teacher data, learning data, or training data.

Basically, training data is generated manually. For example, Patent Document 1 describes a method of creating training data by using a data processing device having a display unit and a touch panel unit detecting a touch operation. In the case of the method described in Patent Document 1, an operator checks an image displayed on the display unit, determines the category of the image, and performs a flick operation on the touch panel unit in a direction according to the result of the determination. When detecting the flick, the data processing device determines a label according to the flick direction, and generates training data from the determined label and the image displayed on the display unit.
Patent Document 1: Japanese Unexamined Patent Application Publication No. JP-A 2015-148981

Precise recognition of an object in an image by deep learning requires a large amount of training data. It takes much time and effort to manually generate all such a large amount of training data as described in Patent Document 1.

SUMMARY

An object of the present invention is to provide a training data generation apparatus that solves the abovementioned problem; it takes much time and effort to generate a large amount of training data A training data generation apparatus according to an aspect of the present invention includes: a selecting unit configured to select some frame images from among a plurality of frame images composing moving image data as first moving image data, select, as second moving image data, all or some frame images from among the plurality of frame images composing the moving image data having not been selected as the first moving image data, and select, as third moving image data, all or some frame images from among the plurality of frame images composing the moving image data having not been selected either as the first moving image data or as the second moving image data; a first generating unit configured to generate first training data that is labeled data relating to a specific recognition target from the frame images composing the first moving image data; a first learning unit configured to learn a first model recognizing the specific recognition target by using the first training data; a second generating unit configured to generate, by using the first model, second training data that is labeled data relating to the specific recognition target from the frame images composing the second moving image data; a second learning unit configured to learn a second model recognizing the specific recognition target by using the second training data; and a third generating unit configured to generate, by using the second model, third training data that is labeled data relating to the specific recognition target from the frame images composing the third moving image data.

Further, a training data generation method according to another aspect of the present invention includes: selecting some frame images from among a plurality of frame images composing moving image data as first moving image data, selecting, as second moving image data, all or some frame images from among the plurality of frame images composing the moving image data having not been selected as the first moving image data, and selecting, as third moving image data, all or some frame images from among the plurality of frame images composing the moving image data having not been selected either as the first moving image data or as the second moving image data; generating first training data that is labeled data relating to a specific recognition target from the frame images composing the first moving image data; learning a first model recognizing the specific recognition target by using the first training data; generating, by using the first model, second training data that is labeled data relating to the specific recognition target from the frame images composing the second moving image data; learning a second model recognizing the specific recognition target by using the second training data; and generating, by using the second model, third training data that is labeled data relating to the specific recognition target from the frame images composing the third moving image data.

Further, on a non-transitory computer-readable recording medium according to another aspect of the present invention, a program is recorded. The program includes instructions for causing a computer to execute: a process of selecting some frame images from among a plurality of frame images composing moving image data as first moving image data, selecting, as second moving image data, all or some frame images from among the plurality of frame images composing the moving image data having not been selected as the first moving image data, and selecting, as third moving image data, all or some frame images from among the plurality of frame images composing the moving image data having not been selected either as the first moving image data or as the second moving image data; a process of generating first training data that is labeled data relating to a specific recognition target from the frame images composing the first moving image data; a process of learning a first model recognizing the specific recognition target by using the first training data; a process of generating, by using the first model, second training data that is labeled data relating to the specific recognition target from the frame images composing the second moving image data; a process of learning a second model recognizing the specific recognition target by using the second training data; and a process of generating, by using the second model, third training data that is labeled data relating to the specific recognition target from the frame images composing the third moving image data.

With the configurations as described above, the present invention enables reduction of time and effort to generate a large amount of training data.

BRIEF DESCRIPTION OF DRAWINGS

FIG. 5 is a table showing a difference in object recognition precision between in a case where 10 frame images composing first moving image data are selected by the k-means method and in a case where the frame images are selected at random;

EXAMPLE EMBODIMENTS

First Example Embodiment

Figure 1:
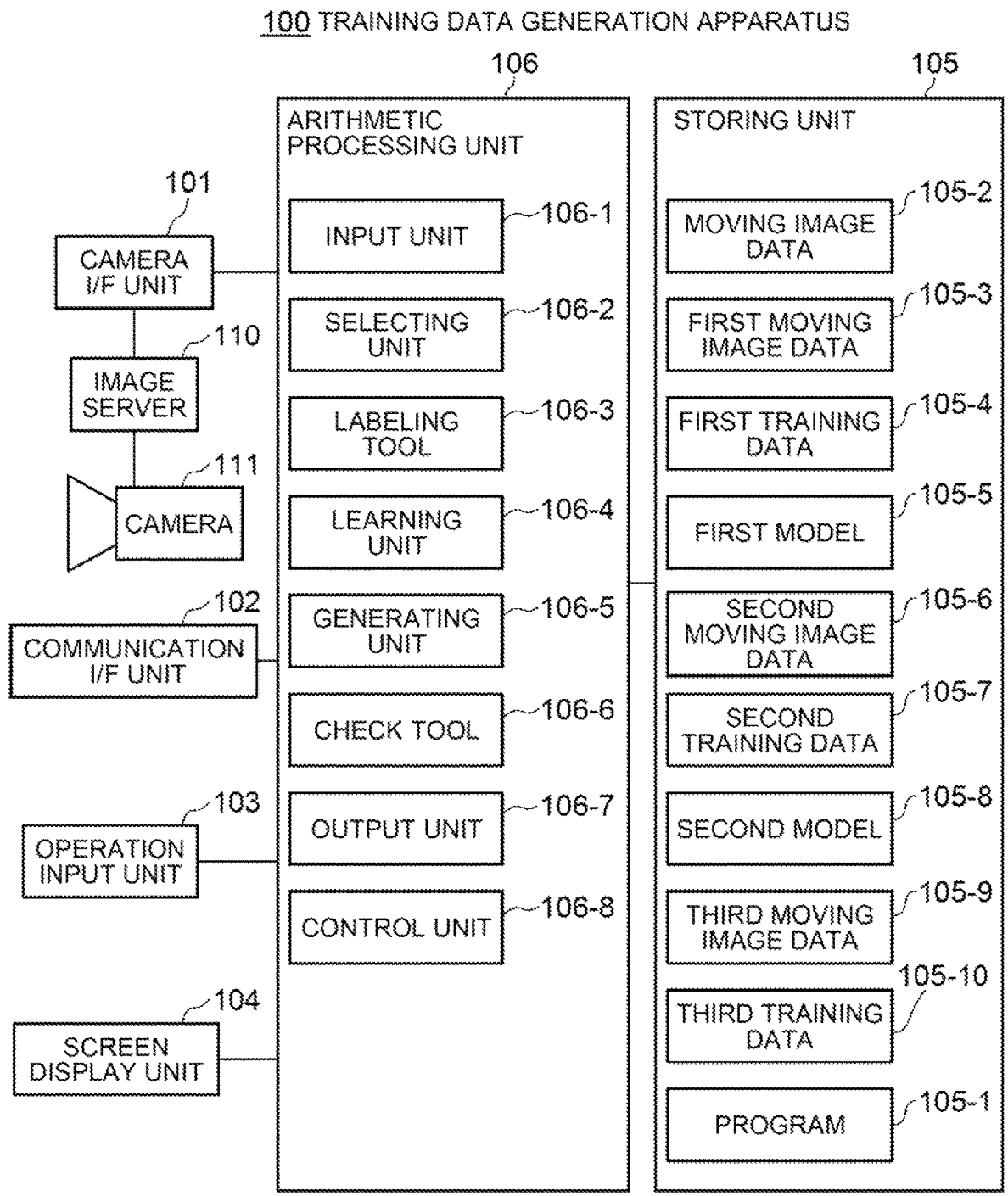
FIG. 1 is a block diagram of a training data generation apparatus according to a first example embodiment of the present invention.

Next, a first example embodiment of the present invention will be described with reference to the drawings. FIG. 1 is a block diagram of a training data generation apparatus 100 according to this example embodiment. Referring to FIG. 1, the training data generation apparatus 100 includes a camera I/F (interface) unit 101, a communication I/F unit 102, an operation input unit 103, a screen display unit 104, a storing unit 105, and an arithmetic processing unit 106.

The camera I/F unit 101 is connected to an image server 110 by wired or wireless communication, and is configured to perform transmission and reception of data between the image server 110 and the arithmetic processing unit 106. The image server 110 is connected to a camera 111 by wired or wireless communication, and is configured to accumulate moving images shot with the camera 111 for a certain period of time in the past. The camera 111 is an imaging device that shoots a moving image containing a specific recognition target. The camera 111 may be, for example, a color camera provided with a CCD (Charge Coupled Device) image sensor or a CMOS (Complementary MOS) image sensor having a pixel capacity of about millions of pixels. The camera 111 may be a dedicated camera installed, for example, on streets where many people and things come and go for the purpose of shooting a moving image for creating training data. Alternatively, the camera 111 may be a camera installed for another purpose such as security and surveillance. Moreover, the camera 111 is desirable to be a camera for shooting a moving image from a fixed place in a fixed shooting direction. The reason is that a moving image shot from a fixed place in a fixed shooting direction has a fixed background, so that object recognition precision is high when a model learned with training data generated from part of the moving image is used to perform object recognition from the rest of the moving image because the background is the same as the background at the time of learning. That is to say, when compared with a moving image in which miscellaneous objects take various positions and postures in front of a free background, a moving image in which miscellaneous objects take various positions and postures in front of a fixed background enables object recognition by deep learning with more ease and precision. However, the present invention is not limited to moving image data with a fixed background. The present invention may be applied to moving image data with a changing background, such as moving image data shot with a camera mounted on a mobile object such as a vehicle.

The communication I/F unit 102 is formed by a data communication circuit, and is configured to perform data communication with an external device, which is not shown, by wired or wireless communication. The operation input unit 103 is formed by an operation input device such as a keyboard and a mouse, and is configured to detect an operator's operation and output to the arithmetic processing unit 106. The screen display unit 104 is formed by a screen display device such as an LCD (Liquid Crystal Display), and is configured to display, on a screen thereof, various information in accordance with an instruction from the arithmetic processing unit 106.

The storing unit 105 is formed by a storage device such as a hard disk and a memory, and is configured to store therein various information and a program 105-1 necessary for various processing by the arithmetic processing unit 106. The program 105-1 is a program that is loaded to and executed by the arithmetic processing unit 116 to realize various processing units, and is previously loaded from an external device or a recording medium, which are not shown, via a data input/output function such as the communication I/F unit 102 and stored into the storing unit 105. Major processing information stored in the storing unit 105 are moving image data 105-2, first moving image data 105-3, first training data 105-4, a first model 105-5, second moving image data 105-6, second training data 105-7, a second model 105-8, third moving image data 105-9, and third training data 105-10.

The moving image data 105-2 is a time-series image shot with the camera 111. The moving image data 105-2 may be a plurality of frame images composing a moving image shot with the camera 111. Alternatively, the moving image data 105-2 may be a plurality of frame images obtained by downsampling the frame rate of a moving image shot with the camera 111. Shooting time is added to each frame image.

The first moving image data 105-3 is moving image data composed of a very small number of frame images selected from the moving image data 105-2.

The first training data 105-4 is training data manually generated from the frame images composing the first moving image data 105-3. The training data includes image data, coordinate data indicating where a target (for example, a person, a vehicle, a stick, a backpack, and so on) corresponding to a class exists in the image, and a truth label representing the class.

The first model 105-5 is a deep learning model (also simply referred to as a model) obtained by learning with the first training data 105-4.

The second moving image data 105-6 is moving image data composed of a plurality of frame images selected from the moving image data 105-2. Preferably, the second moving image data 105-6 is composed so as to have a larger amount of data than the first moving image data 105-3. That is to say, the number of the frame images composing the second moving image data 105-6 is more than that of the first moving image data 105-3.

The second training data 105-7 is training data generated from the second moving image data 105-6 using the first model 105-5.

The second model 105-8 is a deep learning model obtained by learning with the second training data 105-7.

The third moving image data 105-9 is moving image data composed of a plurality of frame images selected from the moving image data 105-2. Preferably, the third moving image data 105-9 is composed so as to have a larger amount of data than the second moving image data 105-6.

The third training data 105-10 is training data generated from the third moving image data 105-9 using the second model 105-8.

The arithmetic processing unit 106 has a processor such as an MPU and a peripheral circuit thereof, and is configured to, by loading the program 105-1 from the storing unit 105 and executing the program 105-1, make the abovementioned hardware cooperate with the program 105-1 and realize various processing units. Major processing units realized by the arithmetic processing unit 106 are an input unit 106-1, a selecting unit 106-2, a labeling tool 106-3, a learning unit 106-4, a generating unit 106-5, a check tool 106-6, an output unit 106-7, and a control unit 106-8.

The input unit 106-1 is configured to acquire moving image data shot with the camera 111 or moving image data obtained by downsampling the frame rate of the above moving image data from the image server 110 through the camera I/F unit 101, and store the moving image data as the moving image data 105-2 into the storing unit 105.

The selecting unit 106-2 is configured to retrieve the moving image data 105-2 from the storing unit 105-2, select some frame images from among a plurality of frame images composing the moving image data 105-2 as the first moving image data 105-3, and store the selected frame images into the storing unit 105. Moreover, the selecting unit 106-2 is configured to select, as the second moving image data 105-6, all or some frame images from among the plurality of frame images composing the moving image data 105-2 having not been selected as the first image data 105-3, and store the selected frame images into the storing unit 105. Moreover, the selecting unit 106-2 is configured to select, as the third moving image data 105-9, all frame images from among the plurality of frame images composing the moving image data 105-2 having not been selected either as the first moving image data 105-3 or as the second moving image data 105-6, and store the selected frame images into the storing unit 105.

Further, the selecting unit 106-2 is configured to determine whether to select all frame images or select some frame images as the second moving image data 105-6 from among the plurality of frame images composing the moving image data 105-2 having not been selected as the first moving image data 105-3 based on the total number of the frame images composing the moving image data 105-2. In other words, the selecting unit 106-2 determines whether to divide the moving image data 105-2 into two, that is, the first moving image data 105-3 and the second moving image data 105-6 or to divide the moving image data 105-2 into three, that is, the first moving image data 105-3, the second moving image data 105-6, and the third moving image data 105-9 based on the total number of the frame images composing the moving image data 105-2. For example, the selecting unit 106-2 is configured to divide into the abovementioned two when the total number of the frame images of the moving image data 105-2 is less than a threshold number, and divide into the abovementioned three when the total number is equal to or more than the threshold number. Herein, the threshold number is previously determined based on the statistic of actual processing time and stored.

The labeling tool 106-3 is configured to retrieve the first moving image data 105-3 from the storing unit 105, generate the first training data 105-4 from the first moving image data 105-3 by interactive processing with the user through the operation input unit 103 and the screen display unit 104, and store as the first training data 105-4 into the storing unit 105. The labeling tool 106-3 is configured to, for example, for each of the frame images composing the first moving image data 105-3, display an image of the frame image on the screen display unit 104, input coordinate data indicating where a target corresponding to a class exists in the image, and a truth label indicating what the target is, and generate training data in which the frame image, the coordinate data, and the truth label are associated with each other. The labeling tool 106-3 can be realized by, for example, a commercially available annotation tool for generating training data.

The learning unit 106-4 is configured to retrieve the first training data 105-4 from the storing unit 105, perform learning by an object recognition method by deep learning with the first training data 105-4 to create a learned model, and store the learned model as the first model 105-5 into the storing unit 105. Moreover, the learning unit 106-4 is configured to retrieve the second training data 105-7 from the storing unit 105, perform learning by the object recognition method by deep learning with the second training data 105-7 to create a learned model, and store the learned model as the second model 105-8 into the storing unit 105. To be specific, the learning unit 106-4 creates the first model 105-5 and the second model 105-8 in the following manner.

The learning unit 106-4 builds the first model 105-5 on a convolutional neural network (CNN), which is a specific architecture of a neural network. However, the architecture of a neural network is not limited to the convolutional neural network, and may be a recurrent neural network or the like. Moreover, the learning unit 106-4 performs learning by giving, to a previously trained model such as RetinaNet, the first training data 105-4 having not been previously learned by the model, and thereby creates the first model 105-5 identifying a desired recognition target (for example, a person, a vehicle, a stick, a backpack, and so on). The object recognition method by deep learning used by the learning unit 106-4 can be, for example, an algorithm based on R-CNN or an algorithm of YOLO (You Only Look None) type. Moreover, after creating the first model 105-5, the learning unit 106-4 performs learning by giving the second training data 105-7 to the created first model 105-5, and thereby creates the second model 105-8.

In the above description, the learning unit 106-4 creates the second model 105-8 by using the first model 105-5. However, the learning unit 106-4 may create the second model 105-8 by, instead of using the first model 105-5, performing learning by giving, to a previously learned model such as RetinaNet, the second training data 105-7 having not been previously learned by the model (and the first training data 105-4 as necessary).

The generating unit 106-5 is configured to retrieve the first model 105-5 and the second moving image data 105-6 from the storing unit 105, perform inference by the object recognition method by deep learning from the frame images composing the second moving image data 105-6 using the first model 105-5, and detect a specific identification target. Moreover, the generating unit 106-5 is configured to create training data relating to the detected identification target and store the training data as the second training data 105-7 into the storing unit 105. For example, in a case where, in an object recognition process performed by inputting a certain frame image composing the second moving image data 105-6 into the first model 105-5, an image within a rectangular area specified by upper-left-vertex coordinate values (x1, y1) and lower-right-vertex coordinate values (x2, y2) is detected as "person", the generating unit 106-5 generates training data in which the frame image, the coordinate values, a truth label "person", and reliability are associated with each other. Herein, the reliability is an index value representing probability of a detection result. In a case where multiple kinds of targets exist within one frame image, a plurality of training data are generated from the one frame image.

Further, the generating unit 106-5 is configured to retrieve the second model 105-8 and the third moving image data 105-9 from the storing unit 105, and perform the same process as the process of generating the second training data 105-7 using the first model 105-5. That is to say, the generating unit 106-5 is configured to detect a specific identification target by performing inference by the object recognition method by deep learning from frame images composing the third moving image data 105-9 using the second model 105-8. Moreover, the generating unit 106-5 is configured to create training data relating to the detected identification target, and store the training data as the third training data 105-10 into the storing unit 105.

The check tool 106-6 is configured to retrieve the second training data 105-7 from the storing unit 106, modify the second training data 105-7 by interactive processing with the user through the operation input unit 103 and the screen display unit 104, and overwrite the second training data 105-7 in the storing unit 105 with the modified training data. For example, the check tool 106-6 displays, for each of the frame images composing the second training data 105-7, an image of the frame image with a detected object surrounded by a rectangular and a detection list. The detection list includes list elements having a one-to-one correspondence to the generated training data. The list elements are each composed of a check box, a class (a target object), a posture (presence or absence of concealment), a reliability label, and so on, and are sorted in descending order of reliability. The user checks the display of the screen display unit 104 and, when there is a mistake, modifies the training data by operation through the operation input unit 103. For example, when the position of a rectangle surrounding a target object is incorrect, the user manually corrects the position of the rectangle by input through the operation input unit 103. Moreover, when an estimated label is incorrect, the user corrects the label to a correct label by input though the operation input unit 103. Moreover, when there is training data erroneously recognizing an object other than a specific object as the specific object, the user deletes the training data by input through the operation input unit 103. Moreover, when there is an omission in detection of a specific target object, the user surrounds the area of the target object with a rectangle by input through the operation input unit 103, inputs a truth label, and creates new training data.

Further, the check tool 106-6 is configured to retrieve the third training data 105-10 from the storing unit 105 and perform the same process as the process for the second training data 105-7.

The output unit 106-7 is configured to retrieve the first training data 105-4, the second training data 105-7, and the third training data 105-10 from the storing unit 105, display on the screen display unit 104 or/and output to an external device through the communication I/F unit 102.

The control unit 106-8 is configured to control the operation of the entire training data generation apparatus 100 by selectively starting or stopping the input unit 106-1, the selecting unit 106-2, the labeling tool 106-3, the learning unit 106-4, the generating unit 106-5, the check tool 106-6, and the output unit 106-7.

Figure 2:
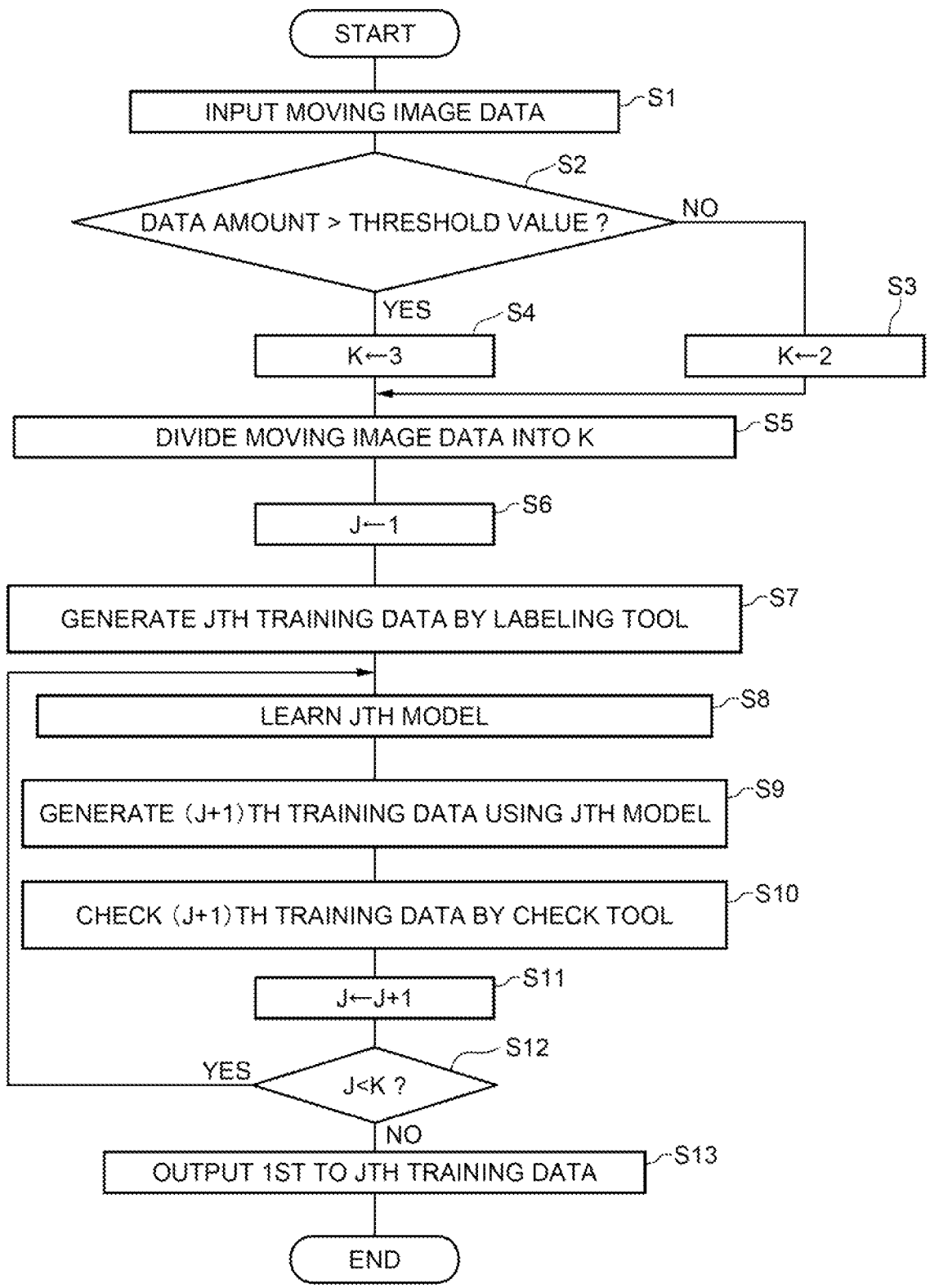
FIG. 2 is a flowchart showing an example of an operation of the training data generation apparatus according to the first example embodiment of the present invention.

FIG. 2 is a flowchart showing an example of an operation of the training data generation apparatus 100. Below, the operation of the training data generation apparatus 100 will be described with reference to the drawings.

When the user inputs a start instruction from the operation input unit 103 for the purpose of generating training data, a process shown in FIG. 2 is started under control by the control unit 106-8.

First, the control unit 106-8 starts the input unit 106-1. The input unit 106-1 acquires moving image data shot with the camera 111 for a certain period of time in the past from the image server 110 through the camera I/F unit 101, and stores the moving image data as the moving image data 105-2 into the storing unit 105 (step S1).

Next, the control unit 106-8 starts the selecting unit 106-2. The selecting unit 106-2 retrieves the moving image data 105-2 from the storing unit 105, and determines whether or not the data amount (the number of frame images) of the moving image data 105-2 is more than a preset threshold value (step S2). The selecting unit 106-2 sets a value 2 to an internal variable K in a case where the data amount of the moving image data 105-2 is not more than the threshold value (step S3), and sets a value 3 to the internal variable K in a case where the data amount is more than the threshold value (step 4). Next, the selecting unit 106-2 divides the moving image data 105-2 into K (step S5). That is to say, when K=3, the selecting unit 106-2 divides the moving image data 105-2 into the first moving image data 105-3 that is a very small amount of data, the second moving image data 105-6 that is a larger amount of data than the first moving image data 105-3, and the third moving image data 105-9 that is a larger amount of data than the second moving image data 105-6. When K=2, the selecting unit 106-2 divides the moving image data 105-2 into the first moving image data 105-3 that is a very small amount of data, and the second moving image data 105-6 that is a larger amount of data than the first moving image data 105-3.

Next, the control unit 106-8 sets 1 to an internal variable J (step S6).

Next, the control unit 106-8 starts the labeling tool 106-3. The labeling tool 106-3 retrieves the first moving image data 105-3 from the storing unit 105, generates the first training data 105-4 from the first moving image data 105-3 by interactive processing with the user through the operation input unit 103 and the screen display unit 104, and stores as the first training data 105-4 into the storing unit 105 (step S7).

Next, the control unit 106-8 starts the learning unit 106-4. The learning unit 106-4 retrieves the first training data 105-4 from the storing unit 105, creates a learned model by learning by the object recognition method by deep learning using the first training data 105-4, and stores the learned model as the first model 105-5 into the storing unit 105 (step S8).

Next, the control unit 106-8 starts the generating unit 106-5. The generating unit 106-5 retrieves the first model 105-5 and the second moving image data 105-6 from the storing unit 105, detects a specific identification target by performing inference by the object recognition method by deep learning from the frame images composing the second moving image data 105-6 using the first model 105-5, creates training data relating to the detected identification target, and stores the training data as the second training data 105-7 into the storing unit 105 (step S9).

Next, the control unit 106-8 starts the check tool 106-6. The check tool 106-6 retrieves the second training data 105-7 from the storing unit 105, modifies the second training data 105-7 by interactive processing with the user through the operation input unit 103 and the screen display unit 104, and overwrites the second training data 105-7 in the storing unit 105 with the modified training data (step S10).

Next, the control unit 106-8 increments the internal variable J to a value 2 (step S11). Next, the control unit 106-8 determines whether or not the value 2 of the internal variable J is smaller than the value of the interval variable K (step S12). In a case where the value 2 of the internal variable J is not smaller than the value of the interval variable K, the control unit 108-8 starts the output unit 106-7. The output unit 106-7 retrieves the first training data 105-4 and the second training data 105-7 from the storing unit 105, displays on the screen display unit 104, or/and outputs to an external device through the communication I/F unit 102 (step S13). Then, the control unit 106-8 finishes the process shown in FIG. 2.

On the other hand, in a case where the value 2 of the interval variable J is smaller than the value of the internal variable K, the control unit 108-8 returns to step S8 and again executes a process as shown below that is similar to the abovementioned process.

First, the control unit 106-8 starts the learning unit 106-4. The learning unit 106-4 retrieves the second training data 105-7 from the storing unit 105, creates a learned model by learning by the object recognition method by deep learning using the second training data 105-7, and stores the learned model as the second model 105-8 into the storing unit 105 (step S8).

Next, the control unit 106-8 starts the generating unit 106-5. The generating unit 106-5 retrieves the second model 105-8 and the third moving image data 105-9 from the storing unit 105, detects a specific identification target by performing inference by the object recognition method by deep learning from the frame images composing the third moving image data 105-9 using the second model 105-8, creates training data relating to the detected identification target, and stores the training data as the third training data 105-10 into the storing unit 105 (step S9).

Next, the control unit 106-8 starts the check tool 106-6. The check tool 106-6 retrieves the third training data 105-10 from the storing unit 105, modifies the third training data 105-10 by interactive processing with the user through the operation input unit 103 and the screen display unit 104, and overwrites the third training data 105-10 in the storing unit 105 with the modified training data (step S10).

Next, the control unit 106-8 increments the internal variable J to a value 3 (step S11). Next, the control unit 106-8 starts the output unit 106-7 because the value 3 of the internal variable J is not smaller than the value of the interval variable K. The output unit 106-7 retrieves the first training data 105-4, the second training data 105-7, and the third training data 105-10 from the storing unit 105, displays on the screen display unit 104, or/and outputs to an external device through the communication I/F unit 102 (step S13). Then, the control unit 106-8 finishes the process shown in FIG. 2.

Next, examples of the configuration of the selecting unit 106-2 will be described.

Example 1 of Selecting Unit 106-2

Figure 3:
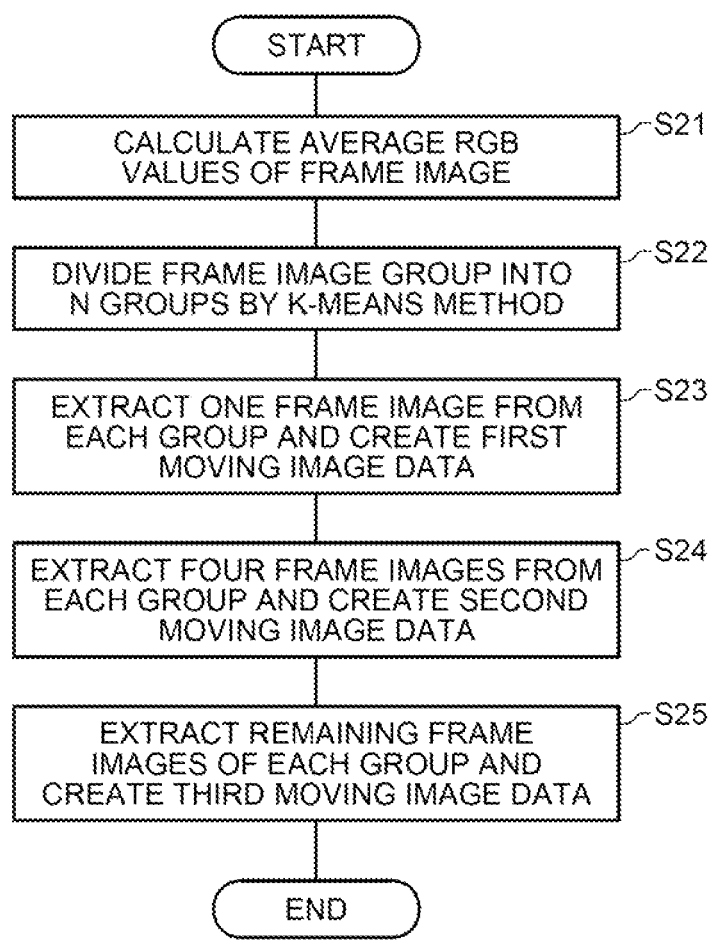
FIG. 3 is a flowchart showing an example of processing by a selecting unit in the training data generation apparatus according to the first example embodiment of the present invention.

FIG. 3 is a flowchart showing an example of processing by the selecting unit 106-2. Referring to FIG. 3, the selecting unit 106-2 calculates average RGB values that are average values of R, G, and B for each of the frame images composing the moving image data 105-2 (step S21). In this example, the RGB color system is used as color information, but another color system such as the HSV color system may be used.

Figure 4:
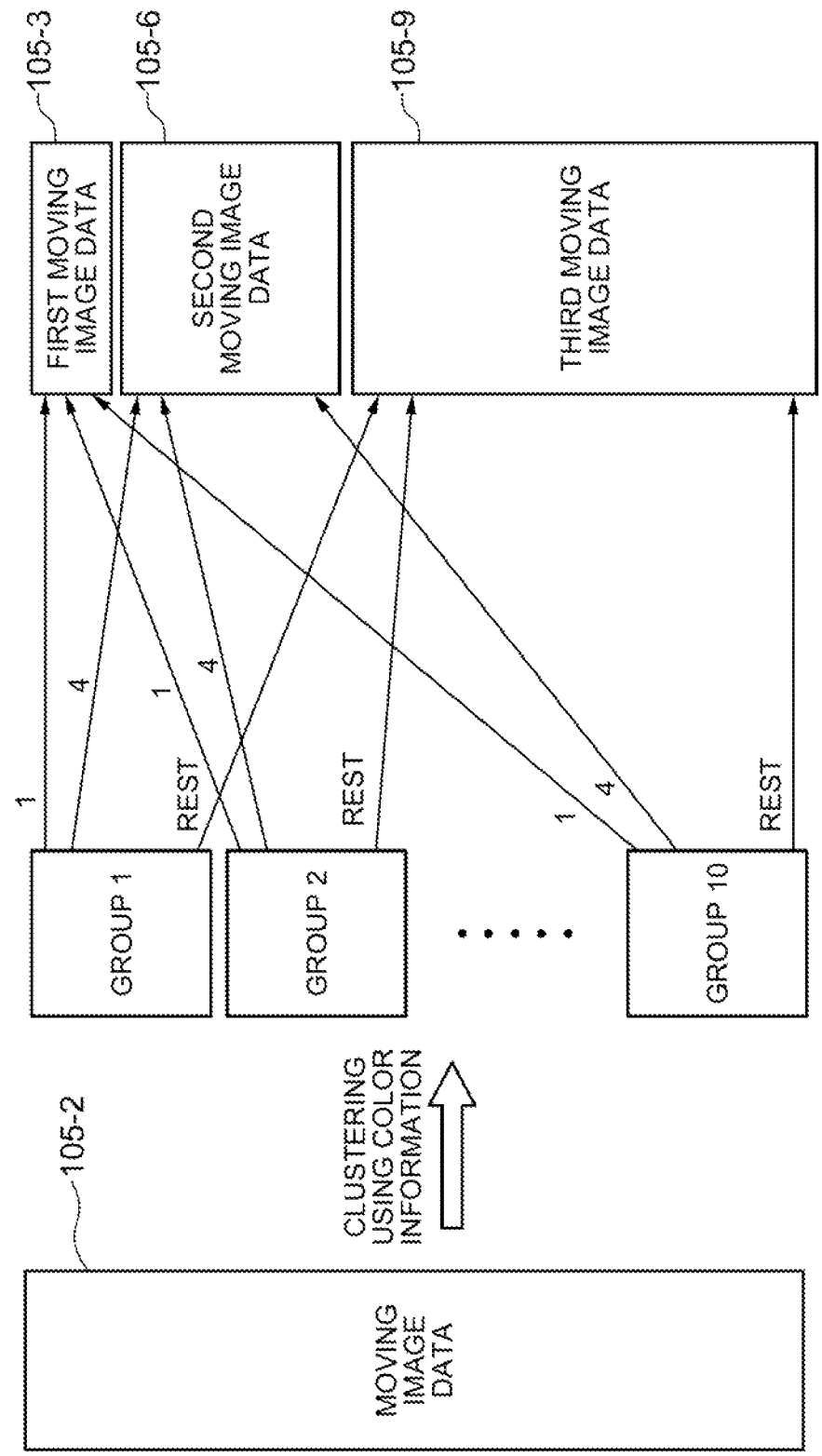
FIG. 4 is an explanation view of an operation of the selecting unit in the training data generation apparatus according to the first example embodiment of the present invention.

Next, as shown in FIG. 4, the selecting unit 106-2 divides a frame image group composing the moving image data 105-2 into n groups (n clusters) by the k-means method using the calculated average RGB values (step S22). Herein, n is a predetermined positive integer of 2 or more. For example, n=10. However, n is not limited to 10, and may be less than 10 or may be 10 or more. Clustering by the k-means method may be performed in the following manner, for example. First, clusters are randomly assigned to the respective frame images, and the center of gravity of each of the clusters is obtained based on the average RGB values of the frame images allocated thereto. Next, the distance between each of the frame images and each of the clusters is obtained, and each of the frame images is allocated to the cluster at a close distance. In a case where there is no change in the center of gravity of each of the clusters, or in a case where the calculation of the center of gravity of each of the clusters is repeated a predetermined number of times, it is determined to be convergence.

Next, as shown in FIG. 4, the selecting unit 106-2 randomly extracts one frame image from each of the groups, and creates the first moving image data 105-3 composed of 10 frame images in total (step S23). In this example, one frame image is extracted from each of the groups, but two or more frame images may be extracted from each of the groups.

Further, as shown in FIG. 4, the selecting unit 106-2 randomly extracts four frame images from each of the groups after extraction of the frame image for the first moving image data 105-3, and creates the second moving image data 105-6 composed of 40 frame images in total (step S24). In this example, four frame images are extracted from each of the groups, but the number is not limited to four, and may be three or may be five or more as long as the number is more than the number of frame image extracted from each of the groups for the first moving image data 105-3.

Further, as shown in FIG. 4, the selecting unit 106-2 generates a set of all the frame images remaining in the respective groups after extraction of the frame images for the first moving image data 105-3 and the second moving image data 105-6, as the third moving image data 105-9 (step S25).

Thus, the selecting unit 106-2 of this example extracts the frame images composing the first moving image data 105-3, the frame images composing the second moving image data 105-6, and the frame images composing the third moving image data 105-9 from the respective groups obtained by performing clustering of the frame image group composing the moving image data 105-2 based on the color information. Therefore, the second moving image data 105-6 has a strong tendency to be a set of frame images representing the third moving image data 105-9, and the first moving image data 105-3 has a strong tendency to be a set of frame images representing the second moving image data 105-6. The reason is as follows.

The average RGB values of frame images are similar when the backgrounds thereof are the same and the color information of targets (for example, persons, cars, sticks, backpacks, and so on) shown therein are similar. Therefore, the n groups obtained by clustering of the moving image data 105-2 with a fixed background based on the color information are those obtained by classifying the frame images based on to the colors of the targets. As a result, a plurality of frame images belonging to the same group tend to contain the same or similar targets.

Then, the first moving image data 105-3 is a set of frame images representing the second moving image data 105-6, so that when object recognition from the second moving image data 105-6 is performed by using the first model 105-5 learned using the first training data 105-4 generated for a target contained in the first moving image data 105-3, a target contained in the second moving image data 105-6 is similar to the target in learning, and therefore, the object recognition precision can be increased. Moreover, the second moving image data 105-6 is a set of frame images representing the third moving image data 105-9, so that when object recognition from the third moving image data 105-9 is performed by using the second model 105-8 learned using the second training data 105-7 generated for a target contained in the second moving image data 105-6, a target contained in the third moving image data 105-9 is similar to the target in learning, and therefore, the object recognition precision can be increased.

FIG. 5 shows the result of an experiment by the present inventor executed to confirm how much the object recognition precision is different between in the case of selecting 10 frame images composing the first moving image data 105-3 by the abovementioned k-means method and in the case of randomly selecting from the moving image data 105-2. The targets of object recognition are six types in total; a standing person, a sitting person, a head, a backpack, a suitcase, and other bags. The precision is the average value of 12 experiments. As shown in FIG. 5, it can be seen that the object recognition precision by the method of selecting the frame images by the k-means method is higher than the object recognition precision by the method of selecting the frame images by the random method.

In the above description, the selecting unit 106-2 performs clustering of a plurality of frame images composing the moving image data 105-2 based on color information. However, an image feature value used for the clustering is not limited to color information. For example, the selecting unit 106-2 may perform clustering of a plurality of frame images composing the moving image data 105-2 based on an image feature value such as edge information. Herein, the edge information can be, for example, the presence or absence of edge, the amount of edge, the shape of edge, and so on.

Example 2 of Selecting Unit 106-2

Figure 6:
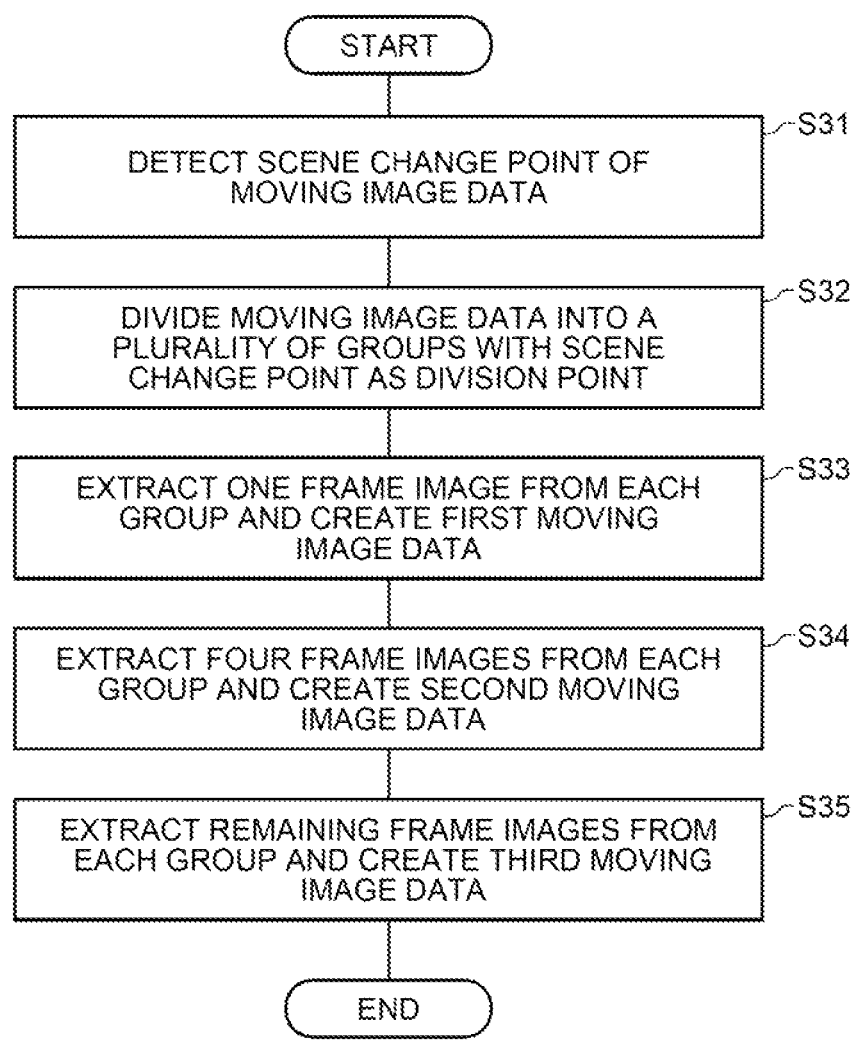
FIG. 6 is a flowchart showing another example of processing by the selecting unit in the training data generation apparatus according to the first example embodiment of the present invention.

FIG. 6 is a flowchart showing another example of processing by the selecting unit 106-2. Referring to FIG. 6, the selecting unit 106-2 first detects a scene change point from the moving image data 105-2 (step S31). For example, the selecting unit 106-2 measures, for each of the frame images composing the moving image data 105-2, the amount of change in image feature value (for example, color information or edge information) from an immediately preceding frame image in time, and detects a scene change when the measured amount of change in image feature value exceeds a predetermined value.

Next, the selecting unit 106-2 divides the moving image data 105-2 into a plurality of groups (a plurality of time-series image data) with the detected scene change point as a division point (step S32). In a case where the number of the detected scene change points is m−1, the number of generated groups is m.

Next, the selecting unit 106-2 randomly extracts one frame image from each of the groups, and creates the first moving image data 105-3 composed of m frame images in total (step S33). In this example, the selecting unit 106-2 selects one frame image from each of the groups, but may extract two or more frame images from each of the groups.

Further, the selecting unit 106-2 randomly extracts four frame images from each of the groups after extraction of the frame images for the first moving image data 105-3, and creates the second moving image data 105-6 composed of 4×m frame images in total (step S34). In this example, the selecting unit 106-2 extracts four frame images from each of the groups, but the number is not limited to four, and may be three or may be five or more as long as the number is more than the number of the frame image extracted from each of the groups for the first moving image data 105-3.

Further, the selecting unit 106-2 generates a set of all the frame images remaining in the respective groups after extraction of the frame images for the first moving image data 105-3 and the second moving image data 105-6, as the third moving image data 105-9 (step S35).

Thus, the selecting unit 106-2 of this example divides a frame image group composing the moving image data 105-2 into a plurality of groups with a scene change point as a division point, and extracts frame images composing the first moving image data 105-3, frame images composing the second moving image data 105-6, and frame images composing the third moving image data 105-9 from the respective groups. Therefore, the second moving image data 105-6 is composed of the frame images of the same scene as of the frame images composing the third moving image data 105-9, and the first moving image data 105-3 is composed of the frame images of the same scene as of the frame images composing the second moving image data 105-6.

Then, the first moving image data 105-3 is composed of the frame images of the same scene as of the frame images composing the second moving image data 105-6, so that when object recognition from the second moving image data 105-6 is performed by using the first model 105-5 learned using the first training data 105-4 generated for a target contained in the first moving image data 105-3, the scene of the second moving image data 105-6 is the same as the scene in learning, and therefore, the object recognition precision can be increased. Moreover, the second moving image data 105-6 is composed of the frame images of the same scene as of the frame images of the third moving image data 105-9, so that when object recognition from the third moving image data 105-9 is performed by using the second model 105-8 learned using the second training data 105-7 generated for a target contained in the second moving image data 105-6, the scenes are the same, and therefore, the object recognition precision can be increased.

The method by which the selecting unit 106-2 generates the first moving image data 105-3, the second moving image data 105-6, and the third moving image data 105-9 from the moving image data 105-2 is not limited to the above examples. For example, the selecting unit 106-2 may generate the first moving image data 105-3, the second moving image data 105-6, and the third moving image data 105-9 by methods as shown below.

Example 3 of Selecting Unit 106-2

The selecting unit 106-2 randomly selects a plurality of frame images composing the first moving image data 105-3 and a plurality of frame images composing the second moving image data 105-6 from the moving image data 105, respectively.

Example 4 of Selecting Unit 106-2

The selecting unit 106-2 mechanically divides the moving image data 105-2 along the time axis into the first moving image data 105-3 composed of about 10 consecutive frame images, the second moving image data 105-6 composed of about 40 consecutive frame images, and the third moving image data 105-9 composed of the remaining frame images.

Example 5 of Selecting Unit 106-2

The selecting unit 106-2 sets about 10 frame images selected every r (r is a positive integer of 2 or more, for example, r=5) frame images from the moving image data 105-2 as the first moving image data 105-3, sets about 40 frame images as the second moving image data 105-6, and sets the remaining frame images as the third moving image data 105-9.

Example 6 of Selecting Unit 106-2

The selecting unit 106-2 displays an image of the frame images composing the moving image data 105-2 on the screen display unit 104, and sets a frame image selected by the user through the operation input unit 103 as the first moving image data 105-3. The user selects a frame image that is likely to be effective for learning as the first moving image data 105-3. Alternatively, the user selects, for each target to be labeled, one or several frame images including the target as the first moving image data 105-3.

Example 7 of Selecting Unit 106-2

The selecting unit 106-2 performs clustering of the moving image data 105-2 for each target to be labeled, and selects a representative frame image from each of the clusters as the first moving image data 105-3.

Example 8 of Selecting Unit 106-2

The selecting unit 106-2 selects a predetermined number of frame images containing more targets to be labeled as the first moving image data 105-3 from the moving image data 105-2.

Example 9 of Selecting Unit 106-2

The selecting unit 106-2 selects a predetermined number of frame images with less occlusion as the first moving image data from the moving image data 105-2.

Example 10 of Selecting Unit 106-2

The selecting unit 106-2 divides the moving image data 105-2 into a plurality of frame image groups so that the similarity between the division units becomes higher, and sets one frame image group among the plurality of frame image groups as the first moving image data 105-3, another one or more frame image groups as the second moving image data 105-6, and the remaining frame image groups as the third moving image data 105-9.

Next, an effect of this example embodiment will be described.

The training data generation apparatus 100 according to this example embodiment can reduce the time and effort to generate a large amount of training data. The reason is that the user needs to manually create only a small part of the training data and the training data generation apparatus 100 mechanically and automatically creates the remaining training data of large amount by inference using a deep learning model.

Figure 7:
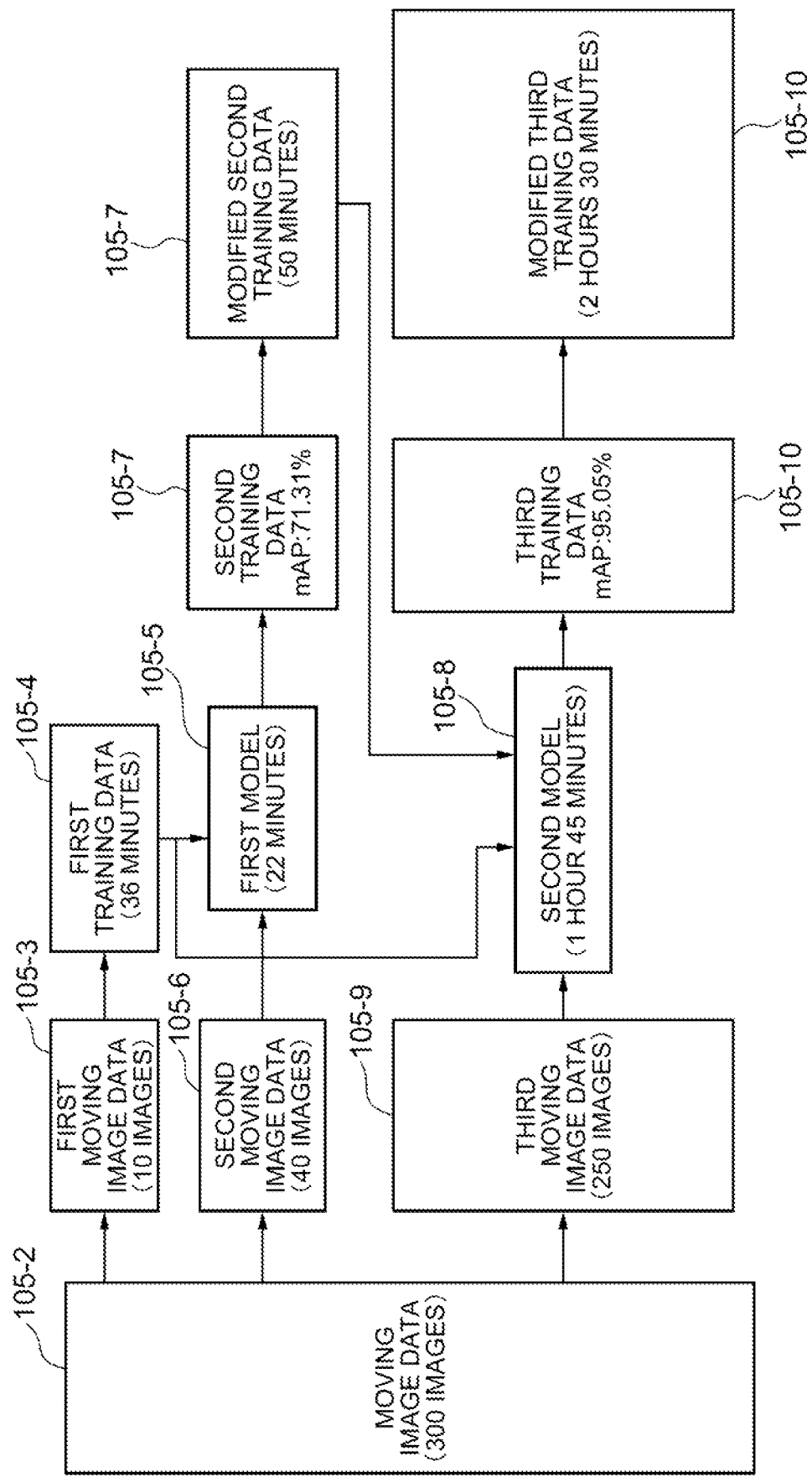
FIG. 7 is a flow diagram showing a procedure by which training data was actually generated from 300 frame images by the method of the first example embodiment of the present invention, and a required time therefor.

FIG. 7 is a flow diagram showing a procedure by which labeled data (training data) was actually generated from 300 frame images by the method of this example embodiment and a required time therefor. Referring to FIG. 7, the selecting unit 106-2 divided the moving image data 105-2 composed of 300 frame images into the first moving image data 105-3 composed of 10 frame images, the second moving image data 105-6 composed of 40 frame images, and the third moving image data 105-9 composed of 250 frame images by the k-means method using color information. Next, the labeling tool 106-3 created the first training data 105-4 from the first moving image data 105-3 by interactive processing with the user. The time required therefor was 36 minutes. Next, the learning unit 106-4 learned the first model 105-5 using the first training data 105-4, and the generating unit 106-5 generated the second training data 105-7 from the second moving image data 105-6 using the first model 105-5. The time required for the learning and generation was 22 minutes. The object authentication precision (mAP) at the time of the generation was 71.31%. Next, the check tool 106-6 checked the second training data 105-7 by interactive processing with the user, and created the checked second training data 105-7. The time required for the check was 50 minutes. Next, the learning unit 106-4 learned the second model 105-8 using the first training data 105-4 and the checked second training data 105-7, and the generating unit 106-5 generated the third training data 105-10 from the third moving image data 105-9 using the second model 105-8. The time required for the learning and generation was 1 hour 45 minutes. The object authentication precision (mAP) at the time of the generation was 95.05%. Finally, the check tool 106-6 checked the third training data 105-10 by interactive processing with the user, and created the checked third training data 105-10. The time required for the check was 2 hours 30 minutes.

Therefore, the total time required to generate the labeled data (training data) from the 300 frame images by the method of this example embodiment was 6 hours 3 minutes, which is the sum of the above times (36 minutes, 22 minutes, 50 minutes, 1 hour 45 minutes, and 2 hours 30 minutes). Since the time to generate the first to third moving image data by the selecting unit 106-2 was extremely short, it was ignored. On the other hand, when the labeling operation was manually performed for all the 300 frame images using the labeling tool 106-3, it took 18 hours. Therefore, by the method according to this example embodiment, it was possible to create the training data in about one third of the processing time by the manual method.

Further, the object authentication precision (mAP: 71.31%) at the time of generating the second training data 105-7 in FIG. 7 was obtained by selecting the frame images by the k-means method using the color information described with reference to FIG. 5. Therefore, in a case where frame images are selected by the random selection method described with reference to FIG. 5 instead of the k-means method, the object authentication precision (mAP) at the time of generating the second training data 105-7 in FIG. 7 drops to 65.70%. Then, the time to check the second training data 105-7 becomes longer than 50 minutes. As can be understood from this, the configuration to select the frame images composing the first moving image data 105-3 by the k-means method greatly contributes to reduction of the time and effort to generate the training data.

Further, according to the method of this example embodiment, when the number of frame images of the moving image data 105-2 is more than a threshold value, the moving image data 105-2 is divided into three and training data is generated by performing model learning and inference two times, so that it is possible to reduce the time and effort to generate training data when the number of frame images is large as compared with the method of dividing the moving image data 105-2 into two at all times regardless of the number of frame images of the moving image data 105-2. Hereinafter, this point will be described with reference to FIG. 7

It will be considered to, in FIG. 7, generate the second training data 105-7 using the first model 105-5 from 290 frame images in total including 40 images of the second moving image data 105-6 and 250 images of the third moving image data 105-9. Hereinafter, this generation method will be referred to as a two-division method. The two-division method eliminates 1 hour 45 minutes required for learning of the second model and inference and 2 hours 30 minutes required for checking the third training data that were necessary in the method of this example embodiment, that is, 4 hours 15 minutes in total. On the other hand, in the two-division method, the amount of data of the second training data 105-7 is larger than in the method of this example embodiment, so that 50 minutes required to check the second training data 105-7 is added. Since the method of this example embodiment requires 50 minutes for training data generated from 40 frame images, the two-division method requires 50 minutes×(290/40)=6 hours 2.5 minutes for the training data generated from 290 frame images. That is to say, according to the two-division method, it takes an extra time of 5 hours 12.5 minutes to check the second training data as compared with the method of this example embodiment. As a result, as compared with the method of this example embodiment, the two-division method requires an extra time, 5 hours 12.5 minutes−4 hours 15 minutes=57.5 minutes, in terms of the total time.

Further, according to the method of this example embodiment, when the number of frame images of the moving image data 105-2 is less than the threshold value, the moving image data 105-2 is divided into two and the training data is generated by performing model learning and inference one time, so that it is possible to reduce the time and effort to generate the training data when the number of frame images is small as compared with the method of processing by dividing the moving image data 105-2 into three at all times regardless of the number of the frame images. The reason is that in the method of dividing a small number of frame images into three, the amount of data of the third moving image data 105-9 becomes extremely small, so that the time to learn the second model 105-8 becomes a bottleneck.

Next, a modification example of this example embodiment will be described.

In this example embodiment, the upper limit of the number of divisions by the selecting unit 106-2 is 3, but the upper limit of the number of divisions may be 4 or more. For example, in a case where the upper limit of the number of divisions is 4, the processing at steps S2 to S5 of FIG. 2 is changed to the following processing. That is to say, the selecting unit 106-2 compares the amount of data of the moving image data 105-2 with a first threshold value and a second threshold value, divides the moving image data 105-2 into two of first and second moving image data when the amount of data is less than the first threshold value, divides the moving image data 105-2 into three of first to third moving image data when the amount of data is equal to or more than the first threshold value and less than the second threshold value, and divides the moving image data 105-2 into four of first to fourth moving image data when the amount of data is equal to or more than the second threshold value. Herein, the amount of data is small in the order of the first moving image data, the second moving image data, the third moving image data, and the fourth moving image data.

Further, in this example embodiment, the upper limit of the number of divisions by the selecting unit 106-2 is 3, but the upper limit of the number of divisions may be fixed to 2 in the case of configuration to handle a small amount of moving image data 105-2 at all times.

Second Example Embodiment

Figure 8:
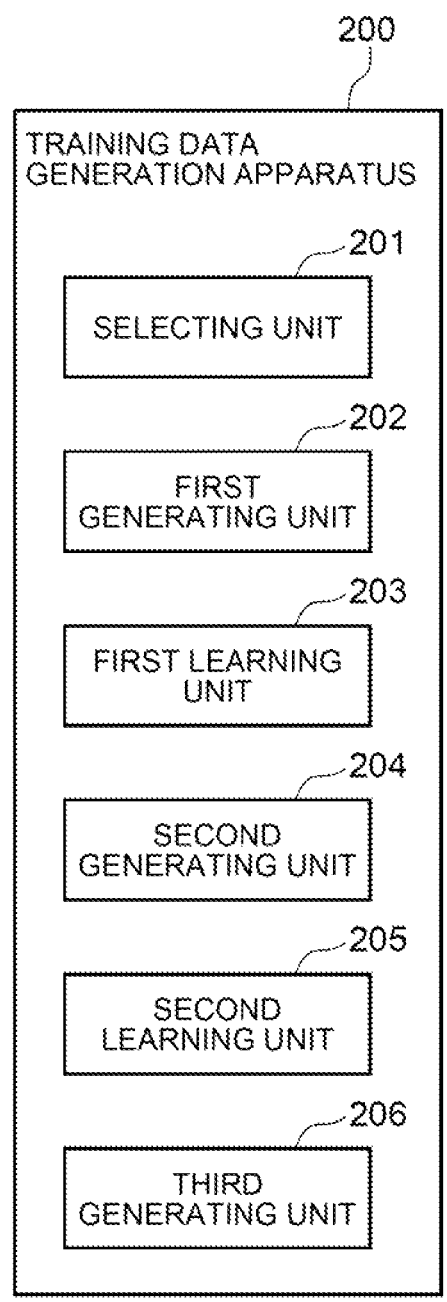
FIG. 8 is a block diagram of a training data generation apparatus according to a second example embodiment of the present invention.

Next, a second example embodiment of the present invention will be described with reference to FIG. 8. FIG. 8 is a block diagram of a training data generation apparatus 200 according to this example embodiment.

Referring to FIG. 8, the training data generation apparatus 200 includes a selecting unit 201, a first generating unit 202, a first learning unit 203, a second generating unit 204, a second learning unit 205, and a third generating unit 206.

The selecting unit 201 is configured to: select some frame images from among a plurality of frame images composing moving image data as first moving image data; select as second moving image data, all or some frame images from among the plurality of frame images composing the moving image data having not been selected as the first moving image data; and select, as third moving image data, all or some frame images from among the plurality of frame images composing the moving image data having not been selected either as the first moving image data or as the second moving image data. The selecting unit 201 can be configured in the same manner as the selecting unit 106-2 of FIG. 1, but is not limited thereto.

The first generating unit 202 is configured to generate first training data that is labeled data relating to a specific recognition target from the plurality of frame images composing the first moving image data. The first generating unit 202 can be configured in the same manner as the labeling tool 106-3 of FIG. 1, but is not limited thereto.

The first learning unit 203 is configured to learn a first model recognizing a specific recognition target by using the first training data. The first learning unit 203 can be configured in the same manner as the learning unit 106-4 of FIG. 1, but is not limited thereto.

The second generating unit 204 is configured to generate second training data that is labeled data relating to a specific recognition target from the plurality of frame images composing the second moving image data by using the first model. The second generating unit 204 can be configured in the same manner as the generating unit 106-5 of FIG. 1, but is not limited thereto.

The second learning unit 204 is configured to learn a second model recognizing a specific recognition target by using the second training data. The second learning unit 204 can be configured in the same manner as the learning unit 106-4 of FIG. 1, but is not limited thereto.

The third generating unit 206 is configured to generate third training data that is labeled data relating to a specific recognition target from the plurality of frame images composing the third moving image data by using the second model. The third generating unit 206 can be configured in the same manner as the generating unit 106-5 of FIG. 1, but is not limited thereto.

The training data generation apparatus 200 thus configured operates in the following manner. The selecting unit 201 selects some frame images from among a plurality of frame images composing moving image data as first moving image data, selects, as second moving image data, all or some frame images from among the plurality of frame images composing the moving image data having not been selected as the first moving image data, and selects, as third moving image data, all or some frame images from among the plurality of frame images composing the moving image data having not been selected either as the first moving image data or as the second moving image data. Next, the first generating unit 202 generates first training data that is labeled data relating to a specific recognition target from the plurality of frame images composing the first moving image data. Next, the first learning unit 203 learns a first model recognizing a specific recognition target by using the first training data. Next, the second generating unit 204 generates, by using the first model, second training data that is labeled data relating to a specific recognition target from the plurality of frame images composing the second moving image data. Next, the second learning unit 205 learns a second model recognizing a specific recognition target by using the second training data. Next, the third generating unit 206 generates, by using the second model, third training data that is labeled data relating to a specific recognition target from the plurality of frame images composing the third moving image data.

According to the training data generation apparatus 200 configured and operating as described above, it is possible to reduce the time and effort to generate a large amount of training data. The reason is that the user needs to manually create only a small part of the training data and the training data generation apparatus 200 mechanically and automatically create the remaining training data of large amount.

Although the present invention has been described above with reference to the example embodiments, the present invention is not limited to the above example embodiments. The configurations and details of the present invention can be changed in various manners that can be understood by one skilled in the art within the scope of the present invention. For example, some or all of the input unit 106-1, the selecting unit 106-2, the labeling tool 106-3, the learning unit 106-4, the generating unit 106-5, the check tool 106-6, the output unit 106-7, and the control unit 106-8 shown in FIG. 1 may be configured by computers installed on the cloud.

The present invention can be used in the field of creating training data used when learning a model recognizing an object in an image by deep learning.

The whole or part of the example embodiments disclosed above can be described as, but not limited to, the following supplementary notes.

[Supplementary Note 1]

A training data generation apparatus comprising:
- a selecting unit configured to select some frame images from among a plurality of frame images composing moving image data as first moving image data, select, as second moving image data, all or some frame images from among the plurality of frame images composing the moving image data having not been selected as the first moving image data, and select, as third moving image data, all or some frame images from among the plurality of frame images composing the moving image data having not been selected either as the first moving image data or as the second moving image data;
- a first generating unit configured to generate first training data that is labeled data relating to a specific recognition target from the frame images composing the first moving image data;
- a first learning unit configured to learn a first model recognizing the specific recognition target by using the first training data;
- a second generating unit configured to generate, by using the first model, second training data that is labeled data relating to the specific recognition target from the frame images composing the second moving image data;
- a second learning unit configured to learn a second model recognizing the specific recognition target by using the second training data; and
- a third generating unit configured to generate, by using the second model, third training data that is labeled data relating to the specific recognition target from the frame images composing the third moving image data.

[Supplementary Note 2]

The training data generation apparatus according to Supplementary Note 1, wherein the selecting unit is configured to perform the selection so that a data amount of the second moving image data is more than a data amount of the first moving image data.

[Supplementary Note 3]

The training data generation apparatus according to Supplementary Note 1 or 2, wherein the selecting unit is configured to perform the selection so that a data amount of the third moving image data is more than a data amount of the second moving image data.

[Supplementary Note 4]

The training data generation apparatus according to any of Supplementary Notes 1 to 3, wherein the selecting unit is configured to perform clustering of the plurality of frame images composing the moving image data into a plurality of groups based on a specific image feature value, and extract at least one frame image from each of the groups as the frame image composing the first moving image data.

[Supplementary Note 5]

The training data generation apparatus according to any of Supplementary Notes 1 to 4, wherein the selecting unit is configured to perform clustering of the plurality of frame images composing the moving image data into a plurality of groups based on a specific image feature value, and extract at least one frame image from each of the groups as the frame image composing the second moving image data.

[Supplementary Note 6]

The training data generation apparatus according to any of Supplementary Notes 1 to 5, wherein the selecting unit is configured to perform clustering of the plurality of frame images composing the moving image data into a plurality of groups based on a specific image feature value, and extract at least one frame image from each of the groups as the frame image composing the third moving image data.

[Supplementary Note 7]

The training data generation apparatus according to any of Supplementary Notes 1 to 3, wherein the selecting unit is configured to detect a scene change point of the moving image data, divide the plurality of frame images composing the moving image data into a plurality of groups with the detected scene change point as a division point, and extract at least one frame image from each of the groups as the frame image composing the first moving image data.

[Supplementary Note 8]

The training data generation apparatus according to Supplementary Note 1, 2, 3, or 7, wherein the selecting unit is configured to detect a scene change point of the moving image data, divide the plurality of frame images composing the moving image data into a plurality of groups with the detected scene change point as a division point, and extract at least one frame image from each of the groups as the frame image composing the second moving image data.

[Supplementary Note 9]

The training data generation apparatus according to Supplementary Note 1, 2, 3, 7, or 8, wherein the selecting unit is configured to detect a scene change point of the moving image data, divide the plurality of frame images composing the moving image data into a plurality of groups with the detected scene change point as a division point, and extract at least one frame image from each of the groups as the frame image composing the third moving image data.

[Supplementary Note 10]

The training data generation apparatus according to any of Supplementary Notes 1 to 9, further comprising an input unit configured to acquire, as the moving image data, time-series image data obtained by shooting with an imaging unit configured to shoot from a fixed camera position in a fixed camera field of view.

[Supplementary Note 11]

The training data generation apparatus according to any of Supplementary Notes 1 to 10, wherein the selecting unit is configured to determine whether to select all frame images as the second moving image data or some frame images as the second moving image data from among the plurality of frame images composing the moving image data having not been selected as the first moving image data, based on a total number of the frame images composing the moving image data.

[Supplementary Note 12]

The training data generation apparatus according to any of Supplementary Notes 1 to 11, wherein the selecting unit is configured to determine whether to select all frame images as the third moving image data or some frame images as the third moving image data from among the plurality of frame images composing the moving image data having not been selected either as the first moving image data or as the second moving image data, based on a total number of the frame images composing the moving image data.

[Supplementary Note 13]

The training data generation apparatus according to any of Supplementary Notes 1 to 12, further comprising a check unit configured to modify the second training data generated by the second generating unit by interactive processing with a user.

[Supplementary Note 14]

A training data generation method comprising:
selecting some frame images from among a plurality of frame images composing moving image data as first moving image data, selecting, as second moving image data, all or some frame images from among the plurality of frame images composing the moving image data having not been selected as the first moving image data, and selecting, as third moving image data, all or some frame images from among the plurality of frame images composing the moving image data having not been selected either as the first moving image data or as the second moving image data;
generating first training data that is labeled data relating to a specific recognition target from the frame images composing the first moving image data;
learning a first model recognizing the specific recognition target by using the first training data;
generating, by using the first model, second training data that is labeled data relating to the specific recognition target from the frame images composing the second moving image data;
learning a second model recognizing the specific recognition target by using the second training data; and
generating, by using the second model, third training data that is labeled data relating to the specific recognition target from the frame images composing the third moving image data.

[Supplementary Note 15]

The training data generation method according to Supplementary Note 14, wherein in the selection, the selection is performed so that a data amount of the second moving image data is more than a data amount of the first moving image data.

[Supplementary Note 16]

The training data generation method according to Supplementary Note 14 or 15, wherein in the selection, the selection is performed so that a data amount of the third moving image data is more than a data amount of the second moving image data.

[Supplementary Note 17]

The training data generation method according to any of Supplementary Notes 14 to 16, wherein in the selection, clustering of the plurality of frame images composing the moving image data into a plurality of groups is performed based on a specific image feature value, and at least one frame image is extracted from each of the groups as the frame image composing the first moving image data.

[Supplementary Note 18]

The training data generation method according to any of Supplementary Notes 14 to 17, wherein in the selection, clustering of the plurality of frame images composing the moving image data into a plurality of groups is performed based on a specific image feature value, and at least one frame image is extracted from each of the groups as the frame image composing the second moving image data.

[Supplementary Note 19]

The training data generation method according to any of Supplementary Notes 14 to 18, wherein in the selection, clustering of the plurality of frame images composing the moving image data into a plurality of groups is performed based on a specific image feature value, and at least one frame image is extracted from each of the groups as the frame image composing the third moving image data.

[Supplementary Note 20]

The training data generation method according to any of Supplementary Notes 14 to 16, wherein in the selection, a scene change point of the moving image data is detected, the plurality of frame images composing the moving image data are divided into a plurality of groups with the detected scene change point as a division point, and at least one frame image is extracted from each of the groups as the frame image composing the first moving image data.

[Supplementary Note 21]

The training data generation method according to Supplementary Note 14, 15, 16, or 20, wherein in the selection, a scene change point of the moving image data is detected, the plurality of frame images composing the moving image data are divided into a plurality of groups with the detected scene change point as a division point, and at least one frame image is extracted from each of the groups as the frame image composing the second moving image data.

[Supplementary Note 22]

The training data generation method according to Supplementary Note 14, 15, 16, 20, or 21, wherein in the selection, a scene change point of the moving image data is detected, the plurality of frame images composing the moving image data are divided into a plurality of groups with the detected scene change point as a division point, and at least one frame image is extracted from each of the groups as the frame image composing the third moving image data.

[Supplementary Note 23]

The training data generation method according to any of Supplementary Notes 14 to 22, further comprising acquiring, as the moving image data, time-series image data obtained by shooting with an imaging unit configured to shoot from a fixed camera position in a fixed camera field of view.

[Supplementary Note 24]

The training data generation method according to any of Supplementary Notes 14 to 23, wherein in the selection, it is determined whether to select all frame images as the second moving image data or some frame images as the second moving image data from among the plurality of frame images composing the moving image data having not been selected as the first moving image data, based on a total number of the frame images composing the moving image data.

[Supplementary Note 25]

The training data generation method according to any of Supplementary Notes 14 to 24, wherein in the selection, it is determined whether to select all frame images as the third moving image data or some frame images as the third moving image data from among the plurality of frame images composing the moving image data having not been selected either as the first moving image data or as the second moving image data, based on a total number of the frame images composing the moving image data.

[Supplementary Note 26]

The training data generation method according to any of Supplementary Notes 14 to 25, further comprising modifying the second training data by interactive processing with a user.

[Supplementary Note 27]

A non-transitory computer-readable recording medium on which a program is recorded, the program comprising instructions for causing a computer to execute:
- a process of selecting some frame images from among a plurality of frame images composing moving image data as first moving image data, selecting, as second moving image data, all or some frame images from among the plurality of frame images composing the moving image data having not been selected as the first moving image data, and selecting, as third moving image data, all or some frame images from among the plurality of frame images composing the moving image data having not been selected either as the first moving image data or as the second moving image data;
- a process of generating first training data that is labeled data relating to a specific recognition target from the frame images composing the first moving image data;
- a process of learning a first model recognizing the specific recognition target by using the first training data;
- a process of generating, by using the first model, second training data that is labeled data relating to the specific recognition target from the frame images composing the second moving image data;
- a process of learning a second model recognizing the specific recognition target by using the second training data; and
- a process of generating, by using the second model, third training data that is labeled data relating to the specific recognition target from the frame images composing the third moving image data.

DESCRIPTION OF NUMERALS 100 training data generation apparatus
101 camera I/F unit
102 communication I/F unit
103 operation input unit
104 screen display unit
105 storing unit
105-1 program
105-2 moving image data
105-3 first moving image data
105-4 first training data
105-5 first model
105-6 second moving image data
105-7 second training data
105-8 second model
105-9 third moving image data
105-10 third training data
106 arithmetic processing unit
106-1 input unit
106-2 selecting unit
106-3 labeling tool
106-4 learning unit
106-5 generating unit
106-6 check tool
106-7 output unit
106-8 control unit
200 training data generation apparatus
201 selecting unit
202 first generating unit
203 first learning unit
204 second generating unit
205 second learning unit
206 third generating unit

What is claimed is:

1. A training data generation apparatus comprising:
a memory configured to store instructions; and
a processor configured to execute the instructions to:
select some frame images from among a plurality of frame images composing first moving image data as second moving image data;
select, as third moving image data, at least some frame images from among the plurality of frame images composing the first moving image data having not been selected as the second moving image data;
select, as fourth moving image data, at least some frame images from among the plurality of frame images composing the first moving image data having not been selected either as the second moving image data or as the third moving image data;
generate first training data that is labeled data relating to a specific recognition target from the frame images composing the second moving image data;
learn a first model recognizing the specific recognition target by using the first training data;
generate, by using the first model, second training data that is labeled data relating to the specific recognition target from the frame images composing the third moving image data;

learn a second model recognizing the specific recognition target by using the second training data; and generate, by using the second model, third training data that is labeled data relating to the specific recognition target from the frame images composing the fourth moving image data.

2. The training data generation apparatus according to claim 1, wherein:
a data amount of the third moving image data is more than a data amount of the second moving image data; and
a data amount of the fourth moving image data is more than the data amount of the third moving image data.

3. The training data generation apparatus according to claim 1, wherein the processor is further configured to execute the instructions to:
cluster the plurality of frame images composing the first moving image data into a plurality of groups, based on a specific image feature value; and
extract at least one frame image composing the second moving image data, the frame images composing the third moving image data, and the frame images composing the fourth moving image data from each of the groups.

4. The training data generation apparatus according to claim 1, wherein the processor is further configured to execute the instructions to:
detect a scene change point of the moving image data;
divide the plurality of frame images composing the first moving image data into a plurality of groups with the detected scene change point as a division point; and
extract at least one frame image composing the second moving image data, the frame images composing the third moving image data, and the frame images composing the fourth moving image data from each of the groups.

5. The training data generation apparatus according to claim 1, wherein the first moving image data is time-series image data obtained by shooting with a camera configured to shoot from a fixed camera position in a fixed camera field of view.

6. The training data generation apparatus according to claim 1, wherein the processor is further configured to execute the instructions to:
determine whether to select all frame images as the third moving image data or some frame images as the third moving image data from among the plurality of frame images composing the first moving image data having not been selected as the second moving image data, based on a total number of the frame images composing the first moving image data.

7. The training data generation apparatus according to claim 1, wherein the processor is further configured to execute the instructions to:
determine whether to select all frame images as the fourth moving image data or some frame images as the fourth moving image data from among the plurality of frame images composing the first moving image data having not been selected either as the second moving image data or as the third moving image data, based on a total number of the frame images composing the first moving image data.

8. The training data generation apparatus according to claim 1, wherein the processor is further configured to execute the instructions to modify the generated second training data by interactive processing with a user.

9. A training data generation method comprising:
selecting some frame images from among a plurality of frame images composing first moving image data as second moving image data;
selecting, as third moving image data, at least some frame images from among the plurality of frame images composing the first moving image data having not been selected as the second moving image data;
selecting, as fourth moving image data, at least some frame images from among the plurality of frame images composing the first moving image data having not been selected either as the second moving image data or as the third moving image data;
generating first training data that is labeled data relating to a specific recognition target from the frame images composing the second moving image data;
learning a first model recognizing the specific recognition target by using the first training data;
generating, by using the first model, second training data that is labeled data relating to the specific recognition target from the frame images composing the third moving image data;
learning a second model recognizing the specific recognition target by using the second training data; and
generating, by using the second model, third training data that is labeled data relating to the specific recognition target from the frame images composing the fourth moving image data.

10. The training data generation method according to claim 9, wherein:
a data amount of the third moving image data is more than a data amount of the second moving image data; and
a data amount of the fourth moving image data is more than the data amount of the third moving image data.

11. The training data generation method according to claim 9, wherein in the selection of the second to fourth moving image data, clustering of the plurality of frame images composing the first moving image data into a plurality of groups is performed based on a specific image feature value, and at least one frame image composing the second moving image data, the frame images composing the third moving image data, and the frame images composing the fourth moving image data are selected from each of the groups.

12. The training data generation method according to claim 9, wherein in the selection of the second to fourth moving image data, a scene change point of the first moving image data is detected, the plurality of frame images composing the first moving image data are divided into a plurality of groups with the detected scene change point as a division point, and at least one frame image composing the second moving image data, the frame images composing the third moving image data, and the frame images composing the fourth moving image data are selected from each of the groups.

13. The training data generation method according to claim 9, wherein the first moving image data is time-series image data obtained by shooting with a camera configured to shoot from a fixed camera position in a fixed camera field of view.

14. The training data generation method according to claim 9, wherein in the selection of the third moving image data, it is determined whether to select all frame images as the third moving image data or some frame images as the third moving image data from among the plurality of frame images composing the first moving image data having not been selected as the second moving image data, based on a total number of the frame images composing the first moving image data.

15. The training data generation method according to claim 9, wherein in the selection of the fourth moving image data, it is determined whether to select all frame images as the fourth moving image data or some frame images as the fourth moving image data from among the plurality of frame images composing the first moving image data having not been selected either as the second moving image data or as the third moving image data, based on a total number of the frame images composing the first moving image data.

16. The training data generation method according to claim 9, further comprising modifying the second training data by interactive processing with a user.

17. A non-transitory computer-readable recording medium on which a program is recorded, the program comprising instructions for causing a computer to execute:
  a process of selecting some frame images from among a plurality of frame images composing first moving image data as second moving image data
  a process of selecting, as third moving image data, at least some frame images from among the plurality of frame images composing the first moving image data having not been selected as the second moving image data;
  a process of selecting, as fourth moving image data, at least some frame images from among the plurality of frame images composing the first moving image data having not been selected either as the second moving image data or as the third moving image data;
  a process of generating first training data that is labeled data relating to a specific recognition target from the frame images composing the second moving image data;
  a process of learning a first model recognizing the specific recognition target by using the first training data;
  a process of generating, by using the first model, second training data that is labeled data relating to the specific recognition target from the frame images composing the third moving image data;
  a process of learning a second model recognizing the specific recognition target by using the second training data; and
  a process of generating, by using the second model, third training data that is labeled data relating to the specific recognition target from the frame images composing the fourth moving image data.

* * * * *